United States Patent

[11] 3,593,221

[72] Inventor John Reed
Belmont, Mass.
[21] Appl. No. 12,003
[22] Filed Feb. 17, 1970
[45] Patented July 13, 1971
[73] Assignee The United States of America as represented by the Secretary of the Navy
Continuation-in-part of application Ser. No. 614,377, Feb. 2, 1967, now abandoned.

[54] MEANS FOR DESIGNING A FIXED TUNED, DIRECT-COUPLED FILTER
1 Claim, 5 Drawing Figs.

[52] U.S. Cl. ........ 333/73 W
[51] Int. Cl. ........ H03h 7/10
[50] Field of Search ........ 333/73, 73 W

[56] References Cited
UNITED STATES PATENTS
2,630,533 3/1953 Herlin ........ 333/73 (W)

*Primary Examiner*—Eli Lieberman
*Attorneys*—Richard S. Sciascia, Louis B. Applebaum and Philip Schneider

ABSTRACT: Means for precise design of a direct-coupled resonant filter without the use of adjustable tuning devices. The filter is of the type using a series of reactive obstacles within a waveguide (or transmission and, finally, each obstacle and its associated waveguide section forming a quarter-wave transformer stage. The overall design is approximately calculated on paper; each quarter-wave transformer stage is resonated by charting the effect of moving the positions of the obstacles and thus determining the precise positioning for the desired frequency and Q; and, finally the stages are fitted together by making the reference plane of each previous stage coincide with the reference plane of its succeeding stage so that reflections are minimized.

INVENTOR.
JOHN REED
BY Philip Schneider
Lorin B. Czyzlebaum
ATTORNEYS

MEANS FOR DESIGNING A FIXED TUNED, DIRECT-COUPLED FILTER

CROSS-REFERENCE TO RELATED APPLICATION

This application is a continuation-in-part of Application Ser. No. 614,377, filed 2 Feb. 1967, now abandoned, assigned to the same assignee as the instant application.

STATEMENT OF GOVERNMENT INTEREST

The invention described herein may be manufactured and used by or for the Government of the United States of America for governmental purposes without the payment of any royalties thereon or therefor.

This invention relates to fixed-tuned resonant filters and especially to an improved method of designing such filters without including adjustable tuning devices therein.

BACKGROUND OF THE INVENTION

In many electrical applications, it is necessary to sharply limit the bandwidth of signals to be passed. For example, in radio astronomy, the heavens are scanned for radio signals of specific frequencies. Band-pass filters with sharp upper and lower cutoff frequencies are desired.

One type of filter which can be used is a filter fabricated from a length of transmission guideline. (For the purposes of this description, the term "transmission guideline" or the term "guideine" is defined to include waveguides, coaxial lines, strip lines, and the like, which are means for transmitting RF waves from one point to another). This type of filter can be directly coupled into the guideline, which feeds the signal from the antenna to the rest of the receiver or transmitter circuits.

To obtain the proper electrical characteristics, it is necessary to employ reactive obstacles, that is, inductive posts or capacitive gaps (irises) in the filter section. For purposes of convenience and clarity, the invention will hereinafter be described in terms of a section of waveguide containing inductive posts. However, the same techniques can be employed to design filters from sections of any type of guideline and, by the principle of duality, the analysis is also valid for capacitive obstacles therein. It has been found that the paper design of waveguide filter sections with inductive posts (by the methods of Cohn, etc.) gives only a rough approximation of the required filter characteristics. To obtain optimum performance of the filter, manual tuning devices must be built into the filter and adjustments must be made after the filter has been inserted in its place in the receiving system.

SUMMARY OF THE INVENTION

The objects and advantages of the present invention are accomplished by a procedure providing the precise design of a direct-coupled, resonant, transmission guideline filter. The procedure involves determining the approximate filter design including the number of quarter-wave transformer stages and the susceptances and approximate sizes of the obstacles to be used; determining by actual measurements the obstacle spacings required for proper resonance of the cavity of each stage; and constructing the filter by fitting together the individual resonant stages so that the reference planes between successive stages coincide (i.e., so that the distance between successive obstacles is the sum of the distances between each obstacle and its reference plane).

A filter constructed by this method is a band-pass filter which can be constructed to have very sharp cutoff at the limits of its passband. Very high power-handling capacities can be achieved because the filter can be made without decreasing the size of the waveguide and because the high fields occur in places where there are no sharp corners and no decrease in height.

An object of this invention is to eliminate the need for adjustable tuning means on direct-coupled, resonant, transmission guideline filters.

Other objects and advantages will appear from the following description of an example of the invention, and the novel features will be particularly pointed out in the appended claims.

DESCRIPTION OF THE PREFERRED EMBODIMENT

Figure 1:
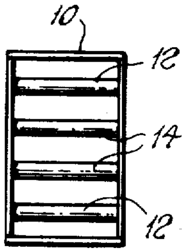
FIG. 1 is an end view of an embodiment of the invention.
Figure 2:
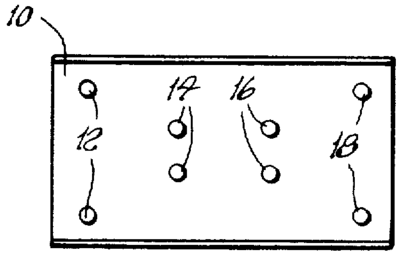
FIG. 2 is a plan view of the embodiment shown in FIG. 1, the top wall of the wave guide being removed.
Figure 3:
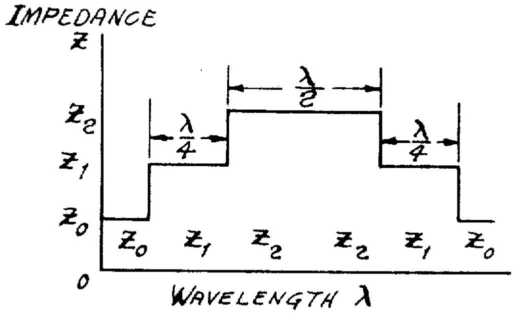
FIG. 3 is a graph showing the impedance levels of the stages of the filter shown in FIG. 2.

A preferred embodiment of a direct-coupled filter 10 is shown in FIGS. 1 and 2. It is a four-stage filter in a section of waveguide, the stages being considered to be quarter-wave transformers. The first set of inductive obstacles 12 and its related section of waveguide comprises a quarter-wavelength transformer or stage which changes the characteristic impedance $Z_0$ (see FIG. 3) of the waveguide into some impedance $Z_1$. The second set of obstacles 14 changes the impedance $Z_1$ to $Z_2$, the third set 16 changes $Z_2$ to $Z_1$ and the fourth set 18 changes $Z_1$ back to the characteristic impedance $Z_0$. Thus the filter section 10 has two levels of impedance and matches at both ends the characteristic impedance of the waveguides to which it is to be coupled.

Each set of obstacles, looked at from properly chosen reference planes, can be represented at one frequency by a quarter-wavelength of waveguide of the proper impedance. The filter will be at resonance if the obstacles are spaced so that the equivalent circuit is a cascade of quarter-wavelength sections of waveguide.

With a given set of obstacles, the easiest way to determine where the reference plane is located is to set up a slotted line of the same inner dimensions as the waveguide that is to be used and connect a matched load beyond the obstacles. The input voltage maximum will occur at the reference plane of the obstacle and since the obstacle is symmetrical relative to the waveguide, the other reference plane is at an equal distance on the other side of the obstacle. The filter will be properly tuned if the reference planes for each set of obstacles are coincident with the nearest reference plane of the adjacent sets of obstacles.

This procedure may not be easy to use because the maximum or minimum on a slotted line section may not accurately be referable back to the obstacles. An alternate method is to space two sets of obstacles along the length of the waveguide so that their reflections cancel each other out at the chosen design frequency. The distance between the obstacles is then twice the distance from an obstacle to its reference plane if the sizes of the two sets of obstacles is the same.

If the sizes of two consecutive sets of obstacles is different, the following method can be employed:

Step 1. Place two equal sets of obstacles of the greater dimension in the waveguide and move one set away from the other until the reflections cancel at the design frequency. The distance, $s_1$, between the sets is the length of a stage at the resonant frequency, and is twice the distance of each set of obstacles from its reference plane.

Step 2. Repeat the procedure outlined in step 1 for two sets of obstacles having the smaller dimension to obtain the length of a stage, $s_2$, for these sets of obstacles.

Step 3. Calculate the distance, $s$, the length of a stage for the desired two sets of obstacles (whose sizes are different) by taking the arithmetic mean of the stage lengths $s_1$ and $s_2$, i.e., $s=(s_1+s_2)/2$ In the design of a practical filter section, a paper design is worked out with the aid of an article by Cohn entitled "Direct-Coupled-Resonator filters," on pages 187–196 of the *Proceedings of the IRE*, Vol. 45, Feb. 1957, which gives formulas for designing this type of filter. The difficulty is that the formulas do not provide for exact design because they are based on the assumption that the obstacles are thin. Since the obstacles in practical filters are not thin, the actual filters are not as accurate as might be desired and it is necessary to adjust the theoretical design when the filters are installed in the waveguide.

Thus, the design is started by choosing from Cohn's article, the susceptances of the posts (obstacles) to be used, their approximate sizes, and the number of stages required for the desired bandwidth and center frequency of the filter. The second step is to develop a resonant cavity for each of these post sizes so that they resonate at the design frequency. The second step includes the procedure of cancellation of reflections referred to previously. The third step is to construct the filter with the reference planes coincident, so that the distance between successive sets of posts is the sum of the distance between each set of posts and its associated reference plane. This is equivalent to saying that the distance between successive sets of posts is the arithmetic mean of the resonant lengths of the two obstacle sets at the design frequency. The resonant length of one set of posts will differ from that of another, differently dimensioned, set. The resonant length of an obstacle set (such as set 14 in FIG. 2) in a waveguide at the desired frequency is the distance between the voltage maxima on either side of the obstacle set along the length of the waveguide. This is actually twice the distance between the obstacle set and one of its reference planes. The resonant length is also herein termed "the length of a stage" or "the stage length."

Figure 4:
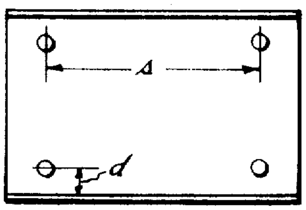
FIG. 4 is a plan view of a waveguide filter section, the top wall of the waveguide being removed which is to have its obstacle spacings and reference plane positions determined at resonance by actual measurement.

The practical adjustment of spacing the posts in the development of a resonant cavity is now described. After the susceptances and sizes of the posts are determined from Cohn's article, two sets of spring-loaded sliding posts of the desired sizes are constructed. The four posts are positioned in the guide with a chosen spacing, *d*, from the sidewalls to the center lines of the nearer posts (see FIG. 4), and distance, *s*, along the guide between the center lines of the sets of posts (the distance, *s*, being the sum of the distances between each set of obstacles and its reference plane). The standing wave ratio caused by the resonant stage is measured at a few frequencies on either side of resonance with a well-matched load and the $Q_L$ and resonant frequency determined. A graph is made listing the $Q_L$ and resonant frequency at points whose horizontal coordinate is *s* and whose vertical coordinate is *d*.

Figure 5:
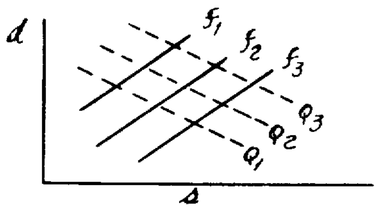
FIG. 5 is a typical graphical plot of the family of curves obtained for the filter section shown in FIG. 4.

After a sufficient number of trials is made, it is possible to draw contours of constant resonant frequency and of constant Q as shown in FIG. 5. These facilitate the selection of *d* and *s* for desired $Q_L$ and frequency.

To determine the value of Q from standing wave measurements, the equivalent susceptance of the resonant stage is measured with a matched load. This susceptance is given by $$b=\frac{r-1}{\sqrt{r}}$$

where *r* is the standing wave ratio of the single stage with matched output. A graph or table (see Table I) of the value of *b* as a function of frequency is made ascribing a positive or negative value of sign to *b* depending on whether the measurement was made at a frequency greater or less than the resonant frequency. The curve will pass through the X axis at the resonant frequency. The 'half power points' can be found as the values of frequency for which the tangent to the curve at resonance goes to a value of plus and minus 2. The table below illustrates the method of determining Q.

TABLE I

| Frequency (Mc.) | VSWR | *b* | *b* difference |
|---|---|---|---|
| 1,238 | 3.94 | −1,480 | |
| | | | .597 |
| 1,240 | 2.35 | −.883 | |
| | | | .579 |
| 1,242 | 1.38 | −.324 | |
| | | | .548 |
| 1,244 | 1.25 | +.224 | |
| | | | .536 |
| 1,246 | 2.10 | +.760 | |

The first column gives the frequency and the second the measured VSWR. The third column gives the equivalent susceptance $b=\frac{r-1}{\sqrt{r}}$ while the fourth column is the difference between values of the third column. Near resonance, the value of *b* is changed by 0.548 for a variation of 2 megacycles so the bandwidth (BW) between 'half power points' is by simple proportion $0.548/2.00=4.00/BW \quad BW=14.6$ mc. Since the resonant frequency is 1243 cm., the Q is 85.

$$\left(Q=\frac{f_0}{BW}\right)$$

In all of these measurements, dissipation loss was neglected.

The following table was made for a nine stage filter with a passband of 1250 to 1350 mc. to give a high attenuation at 1400 mc./sec. The complete filter had 10 obstacles giving nine resonant circuits. The values of *B* presented here are those found in Smith (Direct-Coupled Band-pass Filters in Coaxial Line, page 92, *Electrical Design News*, Vol. 7, No. 9, Aug. 1962) for a 20 percent bandwidth filter with 1.2 VSWR in the passband except that the fifth and sixth obstacles were made to be identical with the fourth and seventh for simplicity.

TABLE II

| Number | B | Q |
|---|---|---|
| 5,6 | −5.61 | 51.27 |
| 4,7 | −5.61 | 51.27 |
| 3,8 | −5.20 | 44.39 |
| 2,9 | −3.57 | 22.06 |
| 1,10 | −1.21 | 3.56 |

The first column gives the order number of the obstacle. The large susceptances are toward the middle of the filter and the filter is symmetrical end to end. The second column gives the normalized susceptance which is desired for each pair of posts at the design frequency. The third column is the loaded Q (neglecting dissipation losses) which would be achieved for a single resonant cavity using two thin shunt susceptances of this value at a frequency of 1292 mc. the design center frequency.

The VSWR over the passband of 1250 to 1350 mc./sec. was less than 1.25 and the insertion loss was less than 0.1 decibel. The bandwidth to the 0.1 db. or 3.0 db. points have very little meaning since these points occur in the guard band where the characteristics of the filter change rapidly with frequency. The power buildup in the filter reaches dangerous levels at the beginning of the stop band. For this filter as a point of comparison the 30 decibel points of attenuation were studied. The calculated response from a digital computer program using ideal susceptances of Table II and the experimental results follow:

TABLE III

| | $f_1$ | $f_2$ | $f_2-f_1$ | $\frac{1}{2}(f_1+f_2)$ | $f_3$ |
|---|---|---|---|---|---|
| Calculated | 1,219 | 1,394 | 175 | 1,306 | 1,900 |
| Measured | 1,223 | 1,391 | 168 | 1,307 | 1,850 |

Table of 30 db. points (frequencies in megacycles) The attenuation at frequencies below $f_1$ was very high dropping down to 30 decibels at $f_1$ and down to almost zero in the passband; then up to 30 decibels at $f_2$. The third column shows the bandwidth between the 30 db points The fourth column shows the mean frequency for the 30 db. points. As pointed out by Cohn, the response of such a filter is nearly symmetric on a guide wavelength basis and not on a frequency basis. This fact accounts for the difference between this figure (1307 mc.) and design center frequency of 1292 mc. No tuning was used.

The calculated curve for attenuation rose up to 89 decibels at 1630 mc. and then dropped down to 30 decibels at $f_3$ equal 1900 megacycles. The maximum attenuation of the model was never really measured, but it dropped down to 30 decibels at 1850 mc.

Phase Linearity: The transmission phase shift of the filter in the passband was studied both theoretically and experimentally. A computer program was arranged so that the phase shift of the complete network—in this case the nine stage filter—was calculated. The phase angle printed out may be in error by integer multiples of 360°. Rather than plot the phase shift over the passband a slightly different scheme was used. The phase shift at the edges of the passband was noted and then the phase shift for a linear variation of phase with frequency over this range was computed. Then from the actual calculated phase shift of the filter, this linear variation was subtracted. The corresponding curve was determined experimentally by using an electronic phase comparator with approximately 16½ feet of coaxial line on one arm and the filter on the other arm. For this graph the experimental data made a continuous curve.

High Power Capabilities: The following table shows the high power capacity of models at 5 microseconds pulse 200 pulses per second with no extra air pressure.

TABLE IV

| Frequency | Power (Megawatts) |
|---|---|
| 1250 | 4.1 |
| 1300 | 7.0 |
| 1350 | 5.5 |

Although sets of obstacles have been described in the case of the preferred embodiment of a wave-guide filter, other types of guideline filter may employ only single obstacles rather than sets.

It will be understood that various changes in the details, materials, and arrangements of parts (and steps), which have been herein described and illustrated in order to explain the nature of the invention, may be made by those skilled in the art within the principle and scope of the invention as expressed in the appended claim.

I claim:

1. A method for designing a fixed tuned, direct-coupled plural stage resonant filter for use with transmission guidelines comprising the steps of:

determining from proper formulas the approximate desired filter including the susceptances of the reactive obstacles for each stage and the number of stages required for a direct-coupled filter with the desired electrical characteristics;

determining for each set of obstacles the spacings and dimensions of the obstacles and the guideline which are required to form a quarter-wavelength transformer stage at the center frequency of the desired passband, the reference plane for each set of obstacles (the reference plane of an obstacle being the plane at which the input voltage maximum will occur) and its associated length of guideline also being determined; and fitting together the individual stages to form the complete filter, individual stages being fitted together so that the distance between successive sets of obstacles is the arithmetic mean of the distances from each set of obstacles to a common reference plane therebetween.